United States Patent [19]
Hahne

[11] Patent Number: 4,583,423
[45] Date of Patent: Apr. 22, 1986

[54] INFINITELY VARIABLE TRANSMISSION FOR AUTOMOTIVE VEHICLE DRIVELINE

[75] Inventor: Dieter Hahne, Bergisch-Gladbach, Fed. Rep. of Germany

[73] Assignee: Ford Motor Company, Dearborn, Mich.

[21] Appl. No.: 581,630

[22] Filed: Feb. 21, 1984

[30] Foreign Application Priority Data

Feb. 24, 1983 [DE] Fed. Rep. of Germany ....... 3306361

[51] Int. Cl.$^4$ .................. F16H 37/08; F16H 11/06
[52] U.S. Cl. ........................ 74/689; 74/701; 74/740; 474/28
[58] Field of Search ............ 74/689, 694, 700, 701, 74/740; 192/48.9, 48.92; 474/18, 28

[56] References Cited

U.S. PATENT DOCUMENTS

| | | | |
|---|---|---|---|
| 3,757,593 | 9/1973 | Svenson | 192/48.92 X |
| 4,317,389 | 3/1982 | Falzoni | 74/689 |
| 4,329,888 | 5/1982 | Falzoni | 74/689 |
| 4,335,629 | 6/1982 | Falzoni | 74/689 |
| 4,392,394 | 7/1983 | Hofbauer et al. | 74/689 |
| 4,458,318 | 7/1984 | Smit et al. | 474/28 X |
| 4,459,878 | 7/1984 | Frank | 74/857 |
| 4,467,670 | 8/1984 | Kawamoto | 74/740 X |
| 4,478,105 | 10/1984 | Yamamuro et al. | 74/689 X |
| 4,494,943 | 1/1985 | Takei et al. | 474/28 |
| 4,502,352 | 3/1985 | Svab | 74/694 X |

FOREIGN PATENT DOCUMENTS

| | | | |
|---|---|---|---|
| 164229 | 12/1981 | Japan | 192/48.92 |
| 140955 | 8/1982 | Japan | 74/694 |
| 2030248 | 4/1980 | United Kingdom | 74/701 |

OTHER PUBLICATIONS

*Road & Track*, "The Flat/Van Doorne Transmatic", by Paul Frere, Aug. 1983, pp. 78-80.

*Primary Examiner*—William F. Pate, III
*Attorney, Agent, or Firm*—Donald J. Harrington; Keith L. Zerschling

[57] ABSTRACT

An infinitely variable transmission mechanism comprising an adjustable driving sheave assembly, an adjustable driven sheave assembly, a ratio controlling servo for adjusting the pitch diameter of said driving sheave assembly and the pitch diameter of said driven sheave assembly, said sheave assemblies being connected by a driving belt, fluid pressure operated servo means for adjustably positioning the pitch diameter of said driving sheave assembly, fluid pressure operated servo means for adjustably positioning the pitch diameter of said driven sheave assembly, a fluid pressure operated starting clutch, a pump for establishing a control pressure, a drive shaft for said pump extending through said first sheave assembly, a first overrunning coupling means for delivering torque from said first sheave assembly to said drive shaft and a second overrunning coupling means for delivering torque from said torque input shaft to said drive shaft whereby said pump is driven and capable of maintaining a control pressure regardless of the direction of torque delivery through said transmission mechanism.

4 Claims, 1 Drawing Figure

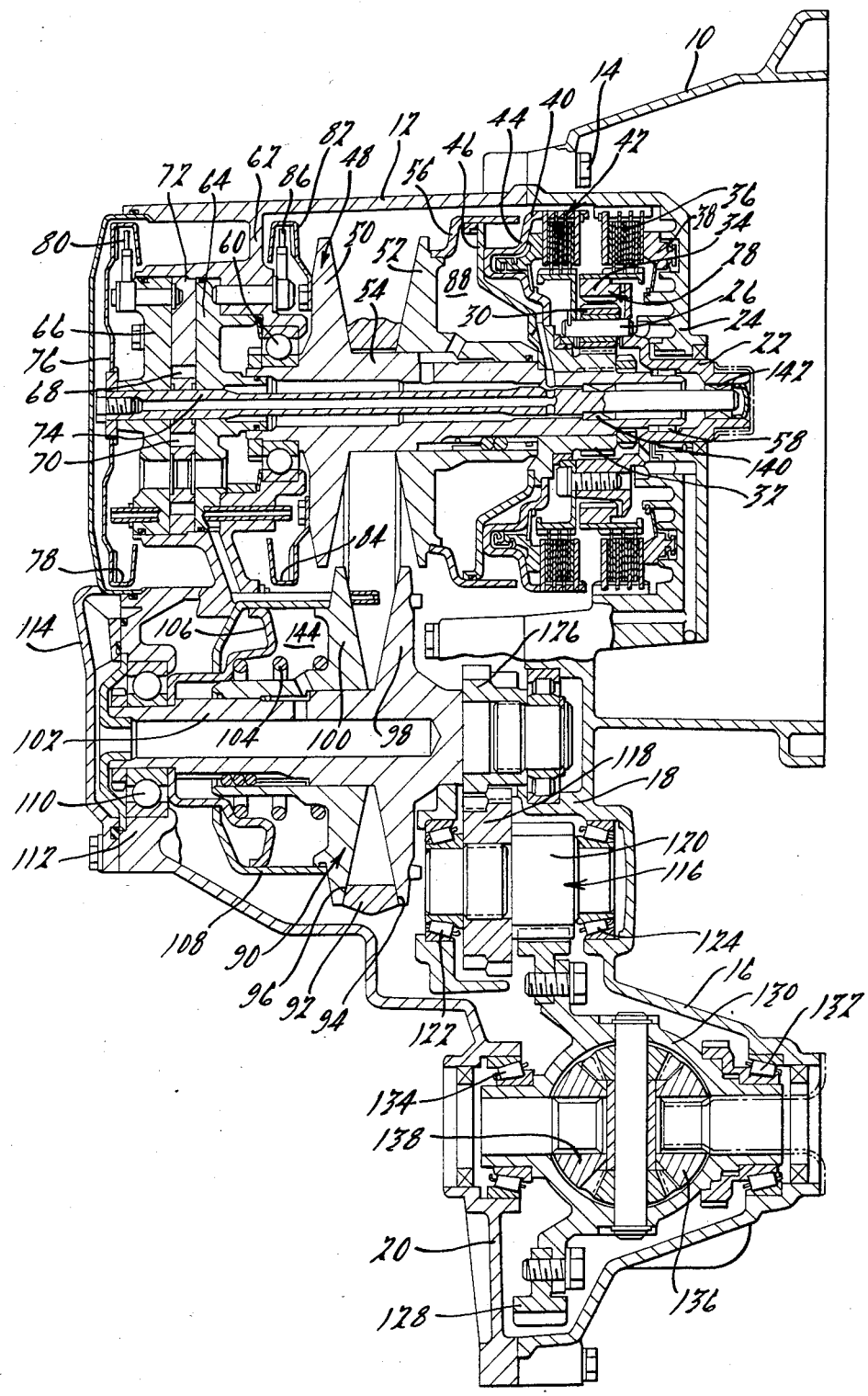

INFINITELY VARIABLE TRANSMISSION FOR AUTOMOTIVE VEHICLE DRIVELINE

BRIEF DESCRIPTION OF THE INVENTION AND THE PRIOR ART

My invention relates generally to infinitely variable transmissions having driving and driven pulleys connected drivably by a drive belt wherein provision is made for varying the effective pitch diameter of the pulleys to provide an infinite variation of torque ratios.

The driving pulley is located on one axis which generally corresponds to the axis of the crankshaft of an internal combustion engine, and the driven pulley is located on an output shaft axis which corresponds to the driving pinion of a differential gear mechanism which in turn has differential side gears connected to each of two axle half shafts for the traction wheels of the vehicle.

The improvement of my invention relates to a push-start feature for the transmission. This feature makes it possible for torque to be transmitted from the traction wheels of the vehicle to the engine through the drive system to enable the engine to be started by push starting or by towing.

I am aware of prior art belt drive systems that use driving and driven pulleys with a drive belt connecting them and that use also multiple ratio gearing or forward-and-reverse gearing in the drive system, the gearing being controlled by pressure operated clutches or brakes. The brakes are supplied by an engine driven pump that develops a pressure for a control system which in turn controls application and release of the actuators for the clutches and brakes. The control system also supplies pressure to a pressure operated servo for the drive pulley and for the driven pulley to establish torque ratio variations and to provide the necessary loading on the belt to prevent slippage of the belt during torque transfer. Examples of such prior art constructions are shown in Fiat Pat. No. 4,329,888 and in Fiat Pat. No. 4,335,629. Each of these patents shows an engine that has a driving connection with a drive pulley that is located on the axis of the engine crankshaft. The engine is connected also to a positive displacement pump which acts as a pressure source for the transmission ratio controlling servos. Both of the constructions of these Fiat patents use a fluid coupling as a torque transmitting device between the engine crankshaft and the input pulleys. A similar drive arrangement is shown in application Ser. No. 429,402, filed by Thomas R. Stockton on Sept. 30, 1982. The Stockton application is assigned to the assignee of this invention.

Unlike the devices of the Fiat patents, the Stockton transmission uses a hydrokinetic torque converter which is located between the engine and the input pulley. The turbine of the torque converter has a wet start-up clutch which is pressurized by a control pump. Like the devices of the Fiat patents, the Stockton transmission uses a control pump that is connected directly to the engine through a pump drive shaft that extends axially through the drive pulley. If an attempt is made to push-start a transmission of the kind shown in the Stockton patent, it would be impossible for torque to be transmitted through the wet clutch since under those conditions the pump would be inactive and the clutch would be disengaged.

The improvement of my invention can be adapted to transmissions of the kind shown in the Fiat patent or in the Stockton application. It can be adapted also to be used in a Van Doorne Transmatic belt drive, such as that described in *Road and Track* magazine for August, 1983, pages 78–80.

According to a principal feature of my invention, the connection between the engine and the drive shaft for the control pump that develops control pressure for the clutches and brakes for the transmission includes an overrunning coupling having a dual operating mode. The coupling assembly is adapted to transmit torque from the engine to the pump drive shaft during normal operation of the engine and transmission assembly. It is capable also of transmitting torque in the opposite direction from the driving pulley to the pump drive shaft when torque is transmitted through the transmission from the traction wheels to the engine. It thus is possible for the pump to be driven regardless of the direction of torque delivery through the transmission. It is possible to maintain the control pressure during push-start operation of the vehicle since the pump will be active and will be capable of developing a control pressure sufficient to enable the wet starting clutch or the transmission clutches and brake servos to be effective.

My invention makes it possible for the vehicle to be started in the event of a failure of the electrical starting system of the engine due to a defective starter or a discharged battery. Starting the vehicle by towing or by coasting down a grade also can be achieved since under either of these conditions the pump will be effective to develop a control pressure.

Another disadvantage of automatic transmission systems using pressure operated clutches and brakes is that towing the vehicle over distances greater than 50 kilometers, for example, at speeds more than 50 kilometers per hour is not advisable without disengaging the drive shafts. Otherwise damage would occur in the automatic transmission gearing because of the absence of pump pressure sufficient to maintain adequate lubrication in the gearing. The ability to withstand towing at high speeds over long distances can be achieved with automatic transmissions if a second oil pump on the torque output side of the transmission is provided so that it is driven by the traction wheels when the engine is inactive. This is not a desirable solution to the problem, however, because it is an added cost to the transmission design and space must be provided in the assembly to accommodate the extra pump. My inventon avoids the need for providing a second pump.

In my improved transmission structure spring pressure is applied to the coned members of the driven pulley assembly so that a minimum pressure is maintained on the belt which enables the belt to maintain the necessary torque transmitting capability without the presence of pressure in the servos that control the belt loading or that control ratio changes in the pulleys. This minimum torque transmitting capability provided by the spring enables towing torque to be transmitted by the belt that is sufficient to drive the pump. The pressure developed by in the pump due to this minimal torque transmission through the belt is sufficient to effect a pressure build up in the servos for the belts and to permit adequate engagement of the transmission clutches and brakes that establish torque distribution through the gearing or through the friction start-up clutch, as the case may be.

DESCRIPTION OF THE DRAWING

The single view in the drawing of my invention is a cross-sectional view of a belt drive transmission assembly showing a starting clutch, forward and reverse gearing, a reverse brake, driving and driven pulleys, a torque transmitting belt and output gearing.

PARTICULAR DESCRIPTION OF THE INVENTION

The transmission shown in the drawing comprises a housing 10 that is adapted to be connected directly to the engine block of an internal combustion engine. A main housing portion 12 is connected to the left hand side of the housing 10 by bolts 14. The lower portion of the housing 10 defines a differential housing 16 and a final drive gear housing 18. By preference, the housing portion 10, 18 and 16 are formed as a single casting. The main housing portion 12, which encloses the driving and driven pulleys, also is formed as a single casting. The lower portion 20 of the housing portion 12 forms a part of the enclosure for the differential gearing.

The crankshaft of the internal combustion engine is connected to input shaft 22 which is journalled in a bearing opening formed in the wall 24 of the housing portion 10. Shaft 22 is connected to carrier 26 of planetary gearing 28, which provides a forward-and-reverse torque flow path. Carrier 26 journals rotatably a first set of pinions 30, which mesh with sun gear 32. Pinions 30 engage drivably a second set of pinions, not shown, which also are journalled on the carrier 26 and which mesh with ring gear 34. Ring gear 34 is adapted to be braked by a selectively operable friction brake 36 which is activated and deactivated by fluid pressure activated servo 38.

Carrier 26 is connected to clutch member 40 by means of a disc type start-up wet clutch 42. Clutch member 40 defines an annular cylinder for a clutch engaging, fluid pressure operated servo 44 which includes a piston that applies a clutching force to the disc of clutch 42.

Clutch member 44 is connected to a servo actuator plate 46 for a driving sheave assembly 48. Sheave assembly 48 comprises cone disc 50 and cone disc 52, the former being formed integrally with sleeve shaft 54. Cone disc 52 is slidably mounted on shaft 54. It carries on its periphery an actuator cylinder 56 within which actuator disc 46 is slidably received. The right hand end of the shaft 54 is journalled on input shaft 22 by bearing 58, and the left hand end of the shaft 54 is journalled by bearing 60 in bearing support 62 which formed a part of the housing portion 12.

A positive displacement pump housing 64 is secured to the housing support 62. It includes a pump closure plate 66 and positive displacement pump gears 68 and 70 located in pump housing 72 adjacent the members 64 and 66. Gear 68 is drivably connected to pump drive shaft 74 which extends through the shaft 54 and is connected at its left hand end to a rotating governor housing 76. Oil channel 78 on the periphery of housing 76 captures lubricating oil. A pitot tube speed sensor 80 is located in the channel 78 so that when the shaft 54 is rotating, lubricating oil captured in the channel 78 rotates with the member 76 thereby causing a velocity pressure to be developed by the speed sensor 80.

Cone disc 50 also carries a governor sensor housing 82 which defines a channel 84 for retaining lubricating oil. A pitot tube speed sensor 86 carried by the support 62 is located in the channel 84 and is adapted to develop a speed pressure in the rotating body of oil that is collected in the channel 84 upon rotation of the cone disc 50.

Cone disc 52 moves relative to cone disc 50 when pressure is admitted to the working chamber 88 located behind the actuator plate 46. Cone assembly 48 is connected drivably to an output cone assembly 90 by a drive belt 92. Belt 92 has cone surfaces 94 and 96 that frictionally engage the juxtaposed cone surfaces on the cone assemblies 48 and 90. When the effective pitch diameter of the cone assembly 48 decreases, the effective pitch diameter of the cone assembly 90 increases and vice versa.

Cone assembly 90 comprises a first cone disc 98 and a second cone disc 100, the latter being slidably positioned on intermediate shaft 102 which forms a part of the cone disc 98. The cone disc 98 and the cone disc 100 are urged together under the force of spring 104 which is anchored on servo plate 106. An actuator servo cylinder 108 carried by the cone disc 100 slidably receives actuator plate 106.

Shaft 102 is journalled by bearings 110 in a bearing opening formed in bearing support portion 112 of the housing 12. Housing portion 100 has an end closure plate 114 secured thereto.

Shown in the lower portion 16 of the housing 10 is torque transfer gearing 116 which comprises a first gear 118 and a second gear 120 of lesser pitch diameter. Gears 118 and 120 are journalled by straddle bearings 122 and 124. Gear 118 meshes with gear 126 carried by cone disc 98 and gear 120 meshes with ring gear 128 carried by differential carrier 130. Differential bearings 132 and 134 journal the carrier 130. The differential side gears 136 and 138 in the carrier 130 are adapted to be connected to axle shafts through U-joints, not shown.

Pump drive shaft 74 is adapted to be drivably connected to shaft 54 through overrunning coupling 140. Shaft 74 is adapted to be connected also to torque input shaft 22 through an overrunning coupling 142. Overrunning couplings 140 and 142 are adapted to deliver torque in the same direction during normal torque delivery from the engine to the traction wheels through the infinitely variable drive sheaves. Clutch 142 acts to deliver driving torque to the pump drive shaft 74, thus enabling the pump to develop circuit pressure which enables the starting clutch 42 to become applied and which enables the sheaves to be adjusted from one speed ratio condition to another. Ratio changes are achieved by varying the pressure in working chamber 88, and belt loading is varied by changing the pressure in working chamber 144 located behind the adjustable sheave cone 100. A threshold belt loading force is achieved by spring 104, but that force is supplemented by the force developed by the pressure in chamber 144.

If the engine should be inactive and it is desired to start the engine by towing or pushing the vehicle, torque is delivered from the traction wheels through the differential and through the gearing 116 to the infinitely variable sheave assemblies. Sheave assembly 48 is driven by the belt which drives the shaft 54. Torque then is delivered through the overrunning coupling 140 to the pump drive shaft 74. The pump then becomes operative and develops a pressure that is used to engage the clutch 42, thereby permitting torque to be delivered to the engine crankshaft to permit starting of the engine. Torque thus is transferred to the pump regardless of the direction of torque input.

Having described a preferred form of my invention, what I claim and desire to secure by U.S. Letters Patent is:

1. In an infinitely variable transmission for use in an automotive vehicle driveline having a fluid pressure operated clutch means for establishing and disestablishing a torque flow path through said transmission;

a driving shaft, a first fixed sheave connected to said driving shaft, clutch means for connecting the driving shaft to a torque input shaft, a first movable sheave mounted on said driving shaft and cooperating with said first fixed sheave to define a driving sheave assembly;

an intermediate shaft and a second fixed sheave carried on said intermediate shaft, a second movable sheave slidably mounted on said intermediate shaft and cooperating with said second fixed sheave to define a driven sheave assembly;

a drive belt drivably connecting said driving sheave assembly and said driven sheave assembly;

an output torque differential gear mechanism, final drive gearing connecting said intermediate shaft to said differential gear assembly;

a positive displacement pump, a drive shaft for said pump extending through said driving shaft, a first overrunning coupling means connecting drivably said pump drive shaft and said driving shaft and a second overrunning coupling connecting drivably said torque input shaft and said pump drive shaft, each overrunning coupling assembly being adapted to distribute torque therethrough to said pump drive shaft in the same direction whereby said pump is driven regardless of the direction of torque delivery through said torque transmitting drive belt;

a fluid pressure clutch servo means for operating said clutch means and a hydraulic connection between said pump and said clutch servo means whereby the latter is actuated to effect torque transfer to said engine when the direction of torque delivery through said transmission mechanism is reversed.

2. The combination as set forth in claim 1 wherein said transmission mechanism includes forward and reverse drive gearing comprising a planetary gear unit having one element thereof connected to said driving shaft and another element thereof connected to said torque input shaft and reverse brake means for anchoring a third element of said gear unit to effect reverse torque delivery to said driving shaft from said torque input shaft when it is actuated.

3. The combination as set forth in claim 1 wherein said first sheave assembly comprises a pressure operated ratio control servo and said second sheave assembly comprises a pressure operated belt loading servo, each servo including structure defining a pressure chamber, said pressure chamber being defined in part also by the associated movable sheave, each sheave assembly servo pressure chamber being in fluid communication with said pump, and spring means acting on the second movable sheave of said driven sheave assembly whereby a minimum belt load is maintained on said belt even in the absence of pressure in the pressure chambers for said sheave assemblies.

4. The combination as set forth in claim 2 wherein said first sheave assembly comprises a pressure operated ratio control servo and said second sheave assembly comprises a pressure operated belt loading servo, each servo including a structure defining pressure chamber, said pressure chambers being defined in part also by the associated movable sheave, each sheave assembly servo pressure chamber being in fluid communication with said pump, and spring means acting on the second movable sheave of said driven sheave assembly whereby a minimum belt load is maintained on said belt even in the absence of pressure in the servos for said sheave assemblies.

* * * * *